Feb. 22, 1955  W. G. LYMAN  2,702,725
SPOKE WHEEL AND HUB THEREFOR
Filed July 15, 1950  4 Sheets-Sheet 2

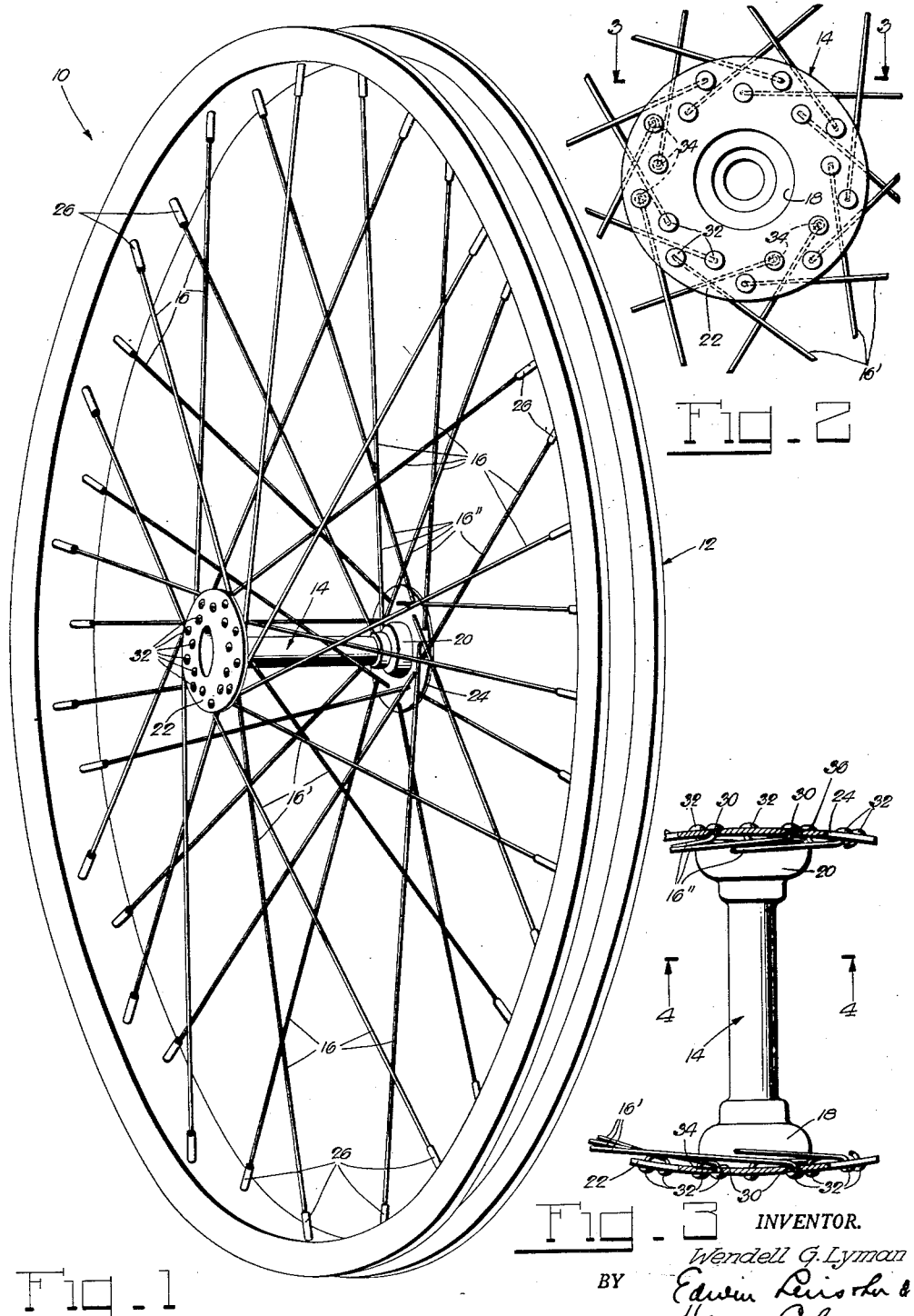

INVENTOR.
Wendell G. Lyman
BY Edwin Reinthal &
Harry Cohen
Attorneys.

United States Patent Office 2,702,725
Patented Feb. 22, 1955

2,702,725

SPOKE WHEEL AND HUB THEREFOR

Wendell G. Lyman, Brooklyn, N. Y., assignor to D. P. Harris Hardware & Manufacturing Co., Inc., New York, N. Y., a corporation of New York Application July 15, 1950, Serial No. 174,075

13 Claims. (Cl. 301—59)

This invention relates to spoke wheels for bicycles and the like.

Heretofore, it was customary to anchor the wire spokes of a wheel for a bicycle or the like in concentrically disposed holes in the opposite end flanges of the axle-receiving hub shell, with the result that adjacent spokes heavily crowded each other, especially at their intersections near the hub shell. This entailed not only undesirable rubbing of the spokes against each other and according rapid wear of the same when the wheel was in use, but rendered the task of assembling and truing the wheel rather difficult. Further, the previous general practice of having the anchored wire spokes of a wheel emerge on the outsides of the end flanges of the hub shell made it imperative to insert the wire spokes in the holes in these end flanges from the inside thereof, which proved to be a rather cumbersome task.

It is the primary aim and object of the present invention to provide a spoke wheel of this type which has none of the above-mentioned disadvantages of previous spoke wheels.

It is, therefore, among the objects of the present invention to provide for the anchorage of the wire spokes of a wheel on the hub shell thereof in such a manner that adjacent spokes do not unduly crowd one another and are in negligible, if any, rubbing contact with each other.

It is another object of the present invention to provide for the anchorage of the wire spokes on the hub shell of a wheel so that the spokes may, if desired, emerge on the insides of the end flanges of the hub shell without unduly crowding each other, thereby to permit the facile insertion of the spokes in the holes in these end flanges from the outside thereof.

The above and other objects, features and advantages of the present invention will be more fully understood from the following description considered in connection with the accompanying illustrative drawings.

In the drawings:

Fig. 1 is a perspective view of a spoke wheel embodying the present invention;

Fig. 2 is an enlarged elevational view of a central portion of the wheel shown in Fig. 1;

Fig. 3 is a fragmentary section taken on the line 3—3 of Fig. 2;

Figure 4:
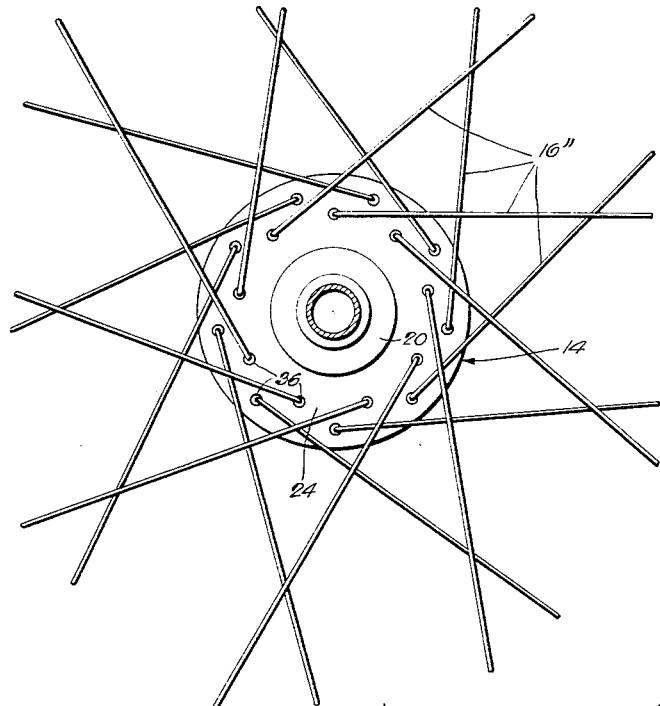
Fig. 4 is a fragmentary section taken on the line 4—4 of Fig. 3.

Referring to the drawings, and more particularly to Fig. 1 thereof, the reference numeral 10 designates a typical spoke wheel used for bicycles, trailers and the like. The wheel 10 comprises a conventional rim 12 adapted to mount a tire (not shown), and a hub shell 14 which extends centrally of the rim 12 and is connected therewith by a multiplicity of spokes 16. The spokes 16 are, for wheels of this type, customarily made of relatively strong resilient wire. The hub shell is, with one exception to be described, conventional and is provided with opposite enlarged ends 18 and 20 which serve for the reception of journal bearings, usually of the anti-friction type, for the wheel axle (neither shown) which extends through the hub shell 14. The enlarged ends 18 and 20 of the hub shell 14 terminate in outwardly formed flanges 22 and 24, respectively, which serve as the anchorage of the inner ends of two sets of spokes 16' and 16", respectively. The outer ends of the spokes 16 are customarily threaded into conventional nipples 26, respectively, which are removably mounted in a well known manner in the rim 12 of the wheel. The inner end of each spoke 16 is for its anchorage on the hub shell 14 bent laterally, as at 30 (Fig. 3), and provided with an enlarged head 32.

For the anchorage of the spokes 16' and 16" on the hub shell 14, the end flanges 22 and 24 of the latter are provided with holes 34 and 36, respectively (Figs. 2, 3 and 4), which, in contrast to the concentrically disposed spoke holes in previous hub shells of wheels of this type, are arranged in a staggered fashion. Thus, the holes 34 in the end flange 22 of the hub shell 14 are alternately disposed in two concentric rows, respectively, in the manner best shown in Fig. 2, and the holes 36 in the opposite end flange 24 of the hub shell 14 are similarly disposed as best shown in Fig. 4. By staggering the holes 34 and 36 in the end flanges 22 and 24, respectively, of the hub shell 14 and having the spokes 16 in the assembled wheel 10 diverge from the hub shell 14 in the conventional near-tangential pattern shown in Figs. 1, 2 and 4, each spoke 16 clears either one of the adjacent spokes and intersects other spokes at some distance from its inner anchored end, with the result that the spokes do not crowd each other at their inner ends and are subjected only to insignificant stresses by virtue of their mutual engagement at their intersections. In previous wheels in which the spokes were anchored in concentrically disposed holes in the hub shell, each spoke intersected a directly adjacent spoke in very close proximity to its inner anchor end, with the result that the spokes were, by virtue of their engagement at these intersections, subjected to very considerable permanent stresses, especially bending stresses, which not only left the spokes excessively stiff and in such forced engagement with each other at their intersections as to entail rapid wear by rubbing against each other when the wheel was in use, but also rendered the assembly and the truing of the wheel comparatively difficult tasks. It thus follows from the foregoing that the staggered anchor holes 34 and 36 in the end flanges 22 and 24, respectively, of the instant hub shell 14 secure several most important advantages over previous spoke wheels of this type. These advantages are not only reflected in the greater ease of assembling the instant wheel, but in the quality of the wheel as well. As to the improved quality of the instant wheel, it is to be noted that the same has an exceptionally long useful life and the spokes thereof will, by virtue of their substantially stress-free condition when mounted, substantially retain their resiliency, with the result that the wheel has better riding qualities, and will be able to absorb shock without permanent deformation much better, than previous spoke wheels of this type. Further, the instant anchorage of the spokes 16 with their heads 32 on the outsides of the respective end flanges 22 and 24 of the hub shell 14 permits the insertion of the spokes in the holes in these end flanges from the outside thereof, which is an easier task than inserting the spokes from the inside thereof.

Figure 5:
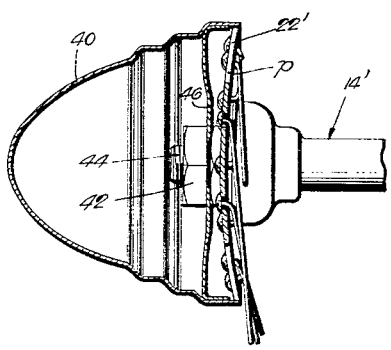
Fig. 5 is a fragmentary section similar to Fig. 3, showing a cap applied to the hub shell of a wheel.

The instant disposal of the inner spoke heads 32 on the outsides of the end flanges 22 and 24 of the hub shell 14 leaves the entire peripheries of these end flanges fully accessible from the outside thereof. This is of advantage for wheels of the instant type when used in the rear of tricycles where they are not straddled by forks of the cycle frame, in that a hub cap 40 may snugly embrace in dust-proof fashion the exposed periphery *p* of the outer end flange of the hub shell of each rear wheel in the manner shown in Fig. 5. Thus, the hub cap 40 may conveniently be held in snug engagement with the periphery *p* of the outer end flange 22' on the hub shell 14' of a wheel by means of a nut 42, for instance, which may threadedly be received by the rear axle 44 of the cycle on which the wheel is mounted, and welded or otherwise secured to an apertured spider 46 on the hub cap 40. Of course, recourse may be had to any other expedient means for mounting the hub cap 40 on the hub shell 14' in such manner that the former may snugly embrace the periphery of the outer end flange 22' of this hub shell.

Figure 6A:
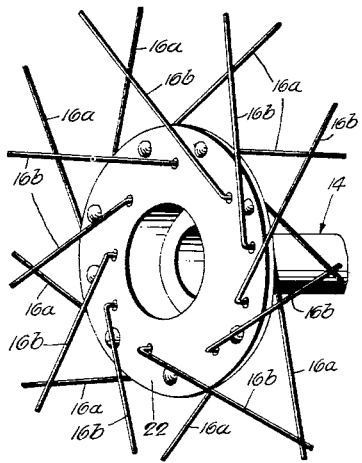
Fig. 6A is a fragmentary perspective view of a central portion of a spoke wheel embodying the present invention in another modified manner.
Figure 6:
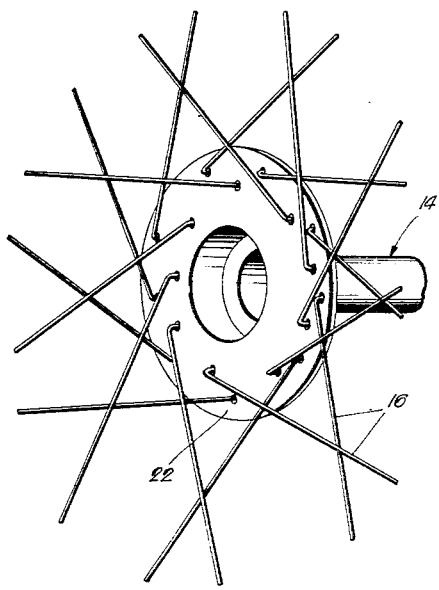
Fig. 6 is a fragmentary perspective view of a central portion of a spoke wheel embodying the present invention in a modified manner.

If it is for any reason desired to have the spokes 16 emerge in the heretofore customary manner from the outside of each of the end flanges 22 and 24 of the hub shell 14 of a wheel, this may be done (Fig. 6) without sacrificing any of the hereinbefore described advantages, save the ease with which the spokes may be inserted in these end flanges from the outside thereof, so long as the anchor holes in these end flanges are staggered in the same or a similar manner as in the hub shell of the previously described wheel (Figs. 1, 2 and 4). In the instant example, the spokes 16 must, of course, be inserted in the holes in the hub shell from the inside of the respective end flanges thereof.

In order effectively to space the spokes in a wheel at their intersections, they may alternately be arranged on the inside and outside of the respective end flange of the hub shell on which they are anchored. Thus, in the case of the end flange 22 of the hub shell 14 in Fig. 6A, for instance, the spokes 16a which diverge from the end flange 22 in the same general direction may be arranged on the inside of the latter, while the remaining spokes 16b may be arranged on the outside of said flange. In thus arranging the spokes on the hub shell, none of them will normally engage any other spoke.

Figure 7:
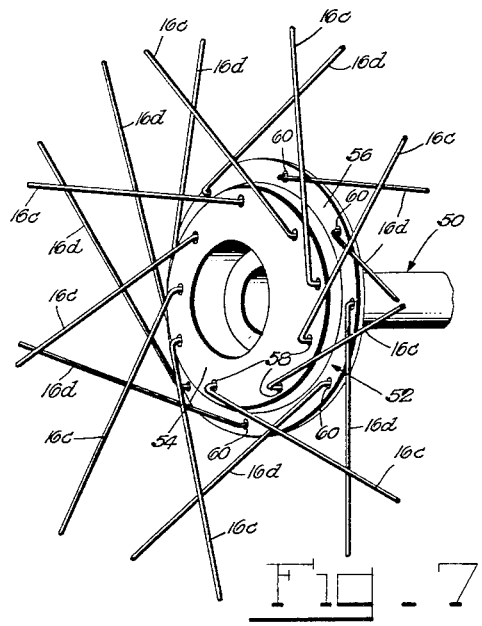
Fig. 7 is a fragmentary perspective view of a central portion of a spoke wheel embodying the present invention in a further modified manner.
Figure 8:
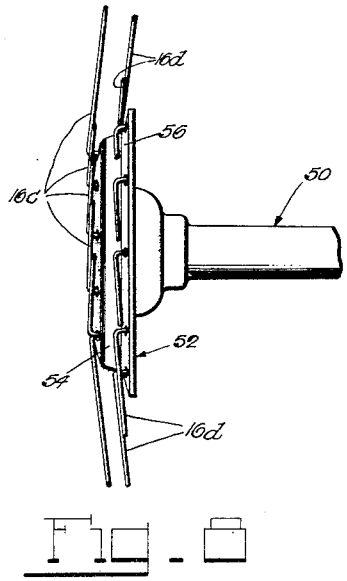
Fig. 8 is a fragmentary side elevation of the wheel portion shown in Fig. 7.

For other effective spacing of the intersecting spokes of a wheel, recourse may be had to the modified hub shell 50 in Figs. 7 and 8, of which each one of the opposite end flanges 52 may be identically dish-shaped so as to provide an inner base portion 54 and an outer offset rim portion 56. The preferably concentrically disposed holes 58 in the base portion 54 of each end flange 52 may serve for the anchorage of the spokes 16c which diverge from the flange in the same general direction, while the concentrically disposed holes 60 in the offset rim portion 56 of the flange may serve for the anchorage of the remaining spokes 16d. Fig. 8 clearly shows the effective spacing of the spokes 16c and 16d which are anchored on the base and rim portions 54 and 56, respectively, of one of the end flanges 52 of the hub shell 50.

Figure 9:
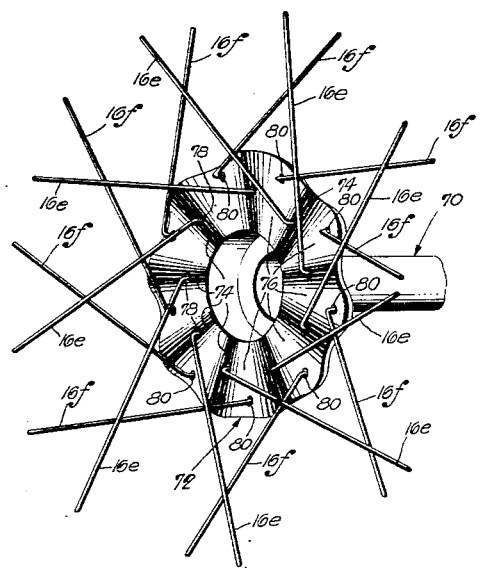
Fig. 9 is a fragmentary perspective view of a central portion of a spoke wheel embodying the present invention in another modified manner.
Figure 10:
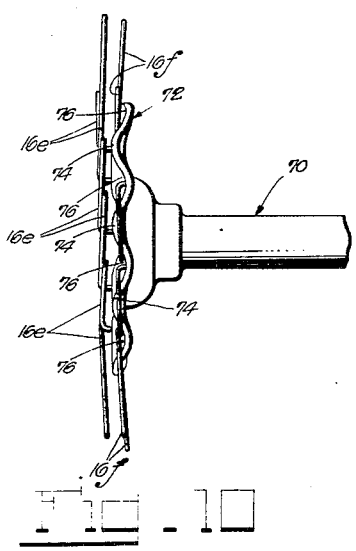
Fig. 10 is a fragmentary side elevation of the wheel portion shown in Fig. 9.

Fig. 9 shows a further modified hub shell 70 of which each end flange 72 may circularly be corrugated so as to provide angularly spaced radially extending ridges 74 which alternate with radial depressions 76. Provided in the ridges 74 in each end flange 72 are concentrically disposed holes 78, respectively, which serve for the anchorage of all spokes 16e which diverge from the flange in the same general direction. Provided in the depressions 76 in each end flange 72 are further concentrically disposed holes 80 which are spaced outwardly from the adjacent inner holes 78 and serve for the anchorage of the remaining spokes 16f. Fig. 10 clearly shows the effective spacing of the spokes 16e and 16f which are anchored in the ridges and depressions 74 and 76, respectively, of one of the end flanges 72 of the hub shell 50.

Figure 11:
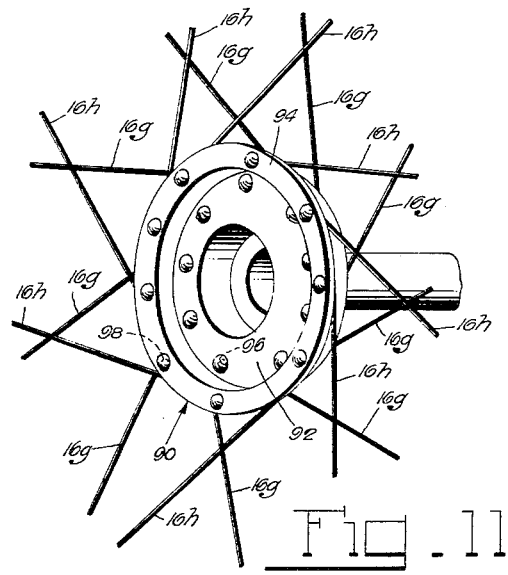
Fig. 11 is a fragmentary perspective view of a central portion of a spoke wheel embodying the present invention in another modified manner.
Figure 12:
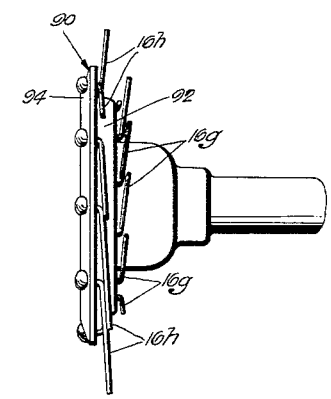
Fig. 12 is a fragmentary side elevation of the wheel portion shown in Fig. 11.

If it is desired to have the spokes of a wheel emerge from the insides of hub shell flanges of the dished type shown in Figs. 7 and 8, the end flanges of the hub shell may assume the reverse dish-shape shown at 90 in Fig. 11. Thus, one of the end flanges 90 of the hub shell shown in Figs. 11 and 12 provides an inner base portion 92 and an outer offset rim portion 94 of which the former is provided with concentrically disposed holes 96 for the anchorage of the spokes 16g, while the rim portion 94 is provided with concentrically disposed holes 98 for the anchorage of the remaining spokes 16h. Fig. 12 shows the effective spacing of the spokes 16g and 16h which are anchored on the base and rim portions 92 and 94, respectively, of one of the end flanges 90.

While Figs. 7 and 11 illustrate the anchorage of the inner ends of spokes 16 so that they emerge from the outside and inside, respectively, of a dished hub shell flange, either type of end flange 52 or 90 in Figs. 7 and 11, respectively, may serve for the anchorage of spokes 16 so that they emerge alternately from the inside and outside of the end flange, as will be readily understood.

Figure 13:
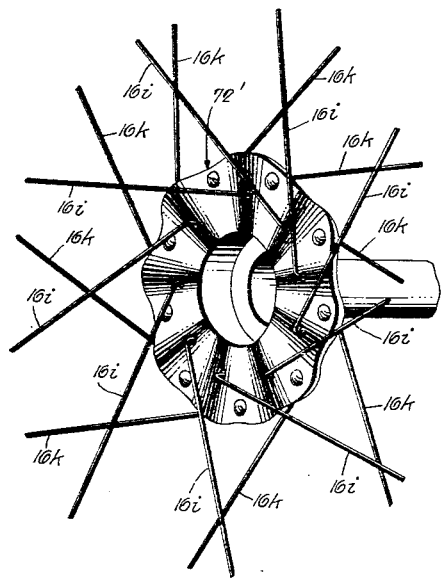
Fig. 13 is a fragmentary perspective view of a central portion of a spoke wheel embodying the present invention in yet another modified manner.
Figure 14:
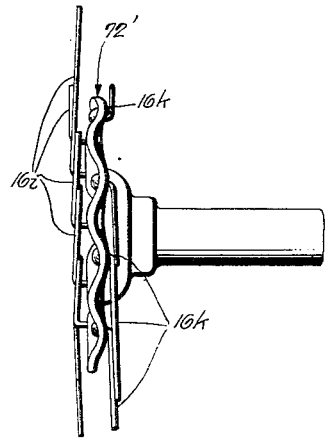
Fig. 14 is a fragmentary side elevation of the wheel portion shown in Fig. 13.

Fig. 13 shows a hub shell flange 72' which may in every respect be like the flange 72 of the hub shell shown in Fig. 9, and on which spokes may be so anchored that all spokes 16i which diverge from the flange in the same general direction emerge from the outside of the flange, and the remaining spokes 16k emerge from the inside of the flange. Fig. 14 further illustrates the outside and inside emergence of the spokes 16i and 16k, respectively, from the flange 72'.

In view of the disclosures of Figs. 9 and 13, it becomes obvious that the type of hub shell flange shown in either of these figures may also serve for the anchorage of spokes so that all of them emerge from the inside of the flange.

While I have shown and described the preferred embodiment of my invention, it will be understood that various changes may be made in the present invention without departing from the underlying idea or principles of the invention within the scope of the appended claims.

Having thus described my invention, what I claim and desire to secure by Letters Patent is:

1. A wheel for bicycles and the like, comprising an endless rim, a hub having opposite flanges, the faces of which are perpendicularly disposed to said hub, and sets of wire spokes connecting said rim with said hub flanges, respectively, the spokes of each set diverging in conventional near-tangential fashion from the respective hub flange with successive spokes of said set extending in opposite directions, respectively, each of said hub flanges having groups of equi-angularly spaced holes extending parallel to the axis of said wheel and arranged in concentric rows, respectively, of which the rows have equal numbers of holes and the holes of one row are inwardly spaced towards the axis of rotation of the wheel from the holes of the other row, and the inner ends of successive spokes of each set being alternately anchored in paired holes of the rows, respectively, in the respective hub flange.

2. A wheel for bicycles and the like, comprising an endless rim, a hub having opposite flanges, the faces of which are perpendicularly disposed to said hub, and sets of wire spokes connecting said rim with said hub flanges, respectively, the spokes of each set diverging in conventional near-tangential fashion from the respective hub flange with successive spokes of said set extending in opposite directions, respectively, each of said hub flanges having groups of equi-angularly spaced holes extending parallel to the axis of said wheel and arranged in concentric rows, respectively, of which the holes of one row are inwardly spaced towards the axis of rotation of the wheel from and disposed intermediate successive holes, respectively, of the other row, and the inner ends of successive spokes of each set being alternately anchored in adjacent holes of the rows, respectively, in the respective hub flange.

3. A wheel as set forth in claim 2, in which said inner end of each spoke projects laterally therefrom and terminates in an enlarged head, and the spokes of each set are anchored in the respective hub flange with their heads exposed on the outside of the latter.

4. A wheel as set forth in claim 2, in which said inner end of each spoke projects laterally therefrom and terminates in an enlarged head, and the spokes of each set are anchored in the respective hub flange with their heads exposed on the inside of the latter.

5. A wheel as set forth in claim 2, in which said inner end of each spoke projects laterally therefrom and terminates in an enlarged head, and the spokes of each set are so anchored with their inner ends that the heads of successive spokes of said set are alternately exposed on the inside and outside, respectively, of the respective hub flange.

6. A wheel for bicycles and the like, comprising an endless rim, a hub having opposite dished flanges of which each flange has a bottom portion and an offset surrounding rim portion, the faces of each of said portions being perpendicularly disposed to said hub, and sets of wire spokes connecting said rim with said hub flanges, respectively, the spokes of each set diverging in conventional near-tangential fashion from the respective hub flange with successive spokes of said set extending in opposite directions, respectively, each of said hub flanges having groups of equi-angularly spaced holes extending parallel to the axis of said wheel and arranged in concentric first and second rows in said bottom and rim portions thereof, respectively, the number of holes in each row being the same and the holes of said first row in each flange being inwardly spaced towards the axis of rotation of the wheel from the holes of the other row therein, and the inner ends of successive spokes of each set being alternately anchored in paired holes of the rows, respectively, in the respective hub flange.

7. A wheel as set forth in claim 6, in which the holes of one row in each hub flange are disposed intermediate the holes of the other row therein, and the inner ends of successive spokes of each set are alternately anchored in adjacent holes of the rows, respectively, in the respective hub flange.

8. A wheel as set forth in claim 6, in which said inner end of each spoke projects laterally therefrom and terminates in an enlarged head, the rim portion of each hub flange is offset from the bottom portion thereof rearwardly toward the opposite hub flange, and the spokes of each set are anchored in the respective hub flange with their heads exposed on the inside of the latter.

9. A wheel for bicycles and the like, comprising an endless rim, a hub having opposite flanges, the faces of which are perpendicularly disposed to said hub, and sets of wire spokes connecting said rim with said hub flanges, respectively, the spokes of each set diverging in conventional near-tangential fashion from the respective hub flange with successive spokes of said set extending in opposite directions, respectively, each of said hub flanges having groups of equi-angularly spaced holes extending parallel to the axis of said wheel and arranged in concentric rows, respectively, of which the rows have equal numbers of holes and the holes of one row are inwardly spaced towards the axis of rotation of the wheel from the holes of the other row, and the inner ends of successive spokes of each set being alternately anchored in paired holes of the rows, respectively, in the respective hub flange, said flanges being dished with each of said flanges having a bottom portion and an offset surrounding rim portion, said one row of holes being disposed in said bottom portion and said other row of holes being disposed in said rim portion of said flanges, said inner end of each spoke projecting laterally therefrom and terminating in an enlarged head, said bottom portion of each hub flange being offset from the rim portion thereof rearwardly towards the opposite hub flange, and the spokes of each set being anchored in the respective hub flange with their heads exposed on the outside of the latter.

10. A wheel for bicycles and the like, comprising an endless rim, a hub having opposite flanges, the faces of which are perpendicularly disposed to said hub, and sets of wire spokes connecting said rim with said hub flanges, respectively, the spokes of each set diverging in conventional near-tangential fashion from the respective hub flange with successive spokes of said set extending in opposite directions, respectively, each of said hub flanges having groups of equi-angularly spaced holes extending parallel to the axis of said wheel and arranged in concentric rows, respectively, of which the rows have equal numbers of holes and the holes of one row are inwardly spaced towards the axis of rotation of the wheel from the holes of the other row, and the inner ends of successive spokes of each set being alternately anchored in paired holes of the rows, respectively, in the respective hub flange, each of said flanges being circularly corrugated to provide alternating radial ridges and depressions, and said rows of holes being disposed in said ridges and depressions, respectively of said flanges.

11. A wheel for bicycles and the like, comprising an endless rim, a hub having opposite flanges, the faces of which are perpendicularly disposed to said hub, and sets of wire spokes connecting said rim with said hub flanges, respectively, the spokes of each set diverging in conventional near-tangential fashion from the respective hub flange with successive spokes of said set extending in opposite directions, respectively, each of said hub flanges having groups of equi-angularly spaced holes extending parallel to the axis of said wheel and arranged in concentric rows, respectively, of which the rows have equal numbers of holes and the holes of one row are inwardly spaced towards the axis of rotation of the wheel from the holes of the other row, and the inner ends of successive spokes of each set being alternately anchored in paired holes of the rows, respectively, in the respective hub flange, each of said flanges being circularly corrugated to provide alternating radial ridges and depressions, and said one and other rows of holes being disposed in said ridges and depressions, respectively of said flanges.

12. A wheel for bicycles and the like, comprising an endless rim, a hub having opposite flanges, the faces of which are perpendicularly disposed to said hub, and sets of wire spokes connecting said rim with said hub flanges, respectively, the spokes of each set diverging in conventional near-tangential fashion from the respective hub flange with successive spokes of said set extending in opposite directions, respectively, each of said hub flanges having groups of equi-angularly spaced holes extending parallel to the axis of said wheel and arranged in concentric rows, respectively, of which the rows have equal numbers of holes and the holes of one row are inwardly spaced towards the axis of rotation of the wheel from the holes of the other row, and the inner ends of successive spokes of each set being alternately anchored in paired holes of the rows, respectively, in the respective hub flange, each of said flanges being circularly corrugated to provide alternating radial ridges and depressions, and said one and other rows of holes being disposed in said ridges and depressions, respectively of said flanges, said inner end of each spoke projecting laterally therefrom and terminating in an enlarged head, and the spokes of each set being anchored in the respective hub flange with their heads exposed on the inside of the latter.

13. A wheel for bicycles and the like, comprising an endless rim, a hub having opposite flanges, the faces of which are perpendicularly disposed to said hub, and sets of wire spokes connecting said rim with said hub flanges, respectively, the spokes of each set diverging in conventional near-tangential fashion from the respective hub flange with successive spokes of said set extending in opposite directions, respectively, each of said hub flanges having groups of equi-angularly spaced holes extending parallel to the axis of said wheel and arranged in concentric rows, respectively, of which the rows have equal numbers of holes and the holes of one row are inwardly spaced towards the axis of rotation of the wheel from the holes of the other row, and the inner ends of successive spokes of each set being alternately anchored in paired holes of the rows, respectively, in the respective hub flange, each of said flanges being circularly corrugated to provide alternating radial ridges and depressions, and said one and other rows of holes being disposed in said ridges and depressions, respectively of said flanges, said inner end of each spoke projecting laterally therefrom and terminating in an enlarged head, and the spokes of each set being anchored in the respective hub flange with their heads exposed on the outside of the latter.

References Cited in the file of this patent

UNITED STATES PATENTS

| Number | Name | Date |
|---|---|---|
| 355,590 | Jeffery | Feb. 9, 1886 |
| 636,274 | Morse | Nov. 7, 1899 |
| 1,353,394 | House | Sept. 21, 1920 |
| 1,418,331 | Schenck et al. | June 6, 1922 |
| 1,836,818 | Sauzedde | Dec. 15, 1931 |